(12) United States Patent
DeAngelis et al.

(10) Patent No.: US 8,418,428 B2
(45) Date of Patent: Apr. 16, 2013

(54) EMBEDDED MESH IN PRECAST WALLS

(75) Inventors: Ronald W. DeAngelis, Cheshire, MA (US); Ralph A. Schwarzer, Lanesboro, MA (US); Sandy S. Spring, Adams, MA (US)

(73) Assignee: Unitrex Corporation, Pittsfield, MA (US)

( * ) Notice: Subject to any disclaimer, the term of this patent is extended or adjusted under 35 U.S.C. 154(b) by 254 days.

(21) Appl. No.: 12/859,047

(22) Filed: Aug. 18, 2010

(65) Prior Publication Data

US 2011/0197545 A1    Aug. 18, 2011

Related U.S. Application Data

(60) Provisional application No. 61/292,654, filed on Jan. 6, 2010.

(51) Int. Cl.
E04B 1/00    (2006.01)
E04B 1/16    (2006.01)
E06B 3/00    (2006.01)

(52) U.S. Cl.
USPC ...... 52/745.15; 52/745.05; 52/380; 52/204.5; 52/204.1

(58) Field of Classification Search ........ 52/745.05, 52/745.15, 426, 380, 204.5, 204.1
See application file for complete search history.

(56) References Cited

U.S. PATENT DOCUMENTS

| | | | |
|---|---|---|---|
| 3,364,841 A * | 1/1968 | Uchiyama | 454/212 |
| 3,775,240 A * | 11/1973 | Harvey | 52/206 |
| 3,785,608 A | 1/1974 | Heinzman et al. | |
| 4,065,540 A | 12/1977 | Okami | |
| 4,472,919 A | 9/1984 | Nourse | |
| 5,360,284 A | 11/1994 | Allard | |
| 5,459,970 A | 10/1995 | Kim | |
| 5,568,710 A | 10/1996 | Smith et al. | |
| 5,685,116 A | 11/1997 | Bradshaw et al. | |
| 5,745,989 A | 5/1998 | Fisher et al. | |
| 5,950,396 A | 9/1999 | Fosdick, Jr. | |
| 6,126,146 A | 10/2000 | Melton | |
| 6,434,901 B1 * | 8/2002 | Schluter | 52/302.1 |
| 6,526,714 B1 | 3/2003 | Billings et al. | |
| 7,455,803 B2 | 11/2008 | Sanger | |
| 7,493,738 B2 * | 2/2009 | Bui | 52/783.11 |
| 2004/0040257 A1 | 3/2004 | Bui | |
| 2010/0325978 A1 * | 12/2010 | Montgomery | 52/199 |

FOREIGN PATENT DOCUMENTS

| | | |
|---|---|---|
| JP | 01-287343 | 11/1989 |
| JP | 07-331769 | 12/1995 |
| JP | 10-299133 | 11/1998 |
| JP | 2002-013209 | 1/2002 |
| JP | 2003-049500 | 2/2003 |
| JP | 2006-045776 | 2/2006 |

OTHER PUBLICATIONS

Author Unknown, "Setting Aluminum Forms for Concrete Walls", retrieved on or before Jan. 28, 2009 at http://video.bobvila.com/m/21320440/setting-aluminum-forms-for-concrete-walls.htm, 1 page.
Author Unkonwn, "ToolBase TechSpecs—Precast Concrete Panels", retrieved on or before Jan. 28, 2009 at http://www.toolbase.org/pdf/techinv/precastconcretepanels_techspec.pdf , prepared for PATH (Partnership for Advancing Technology in Housing) by the NAHB Research Center, pp. 1-4.

* cited by examiner

*Primary Examiner* — Mark Wendell
(74) *Attorney, Agent, or Firm* — Hamilton, Brook, Smith & Reynolds, P.C.

(57) ABSTRACT

Systems and methods for securely attaching a screen or mesh to a pre-stressed or precast concrete wall panel are provided. A screen or mesh is embedded in a concrete form when the concrete form is poured. Portions of the concrete form can be stripped and the wall panel can be easily removed from the form without binding on the form itself and without requiring removal of the portion of the form which creates the window opening.

20 Claims, 12 Drawing Sheets

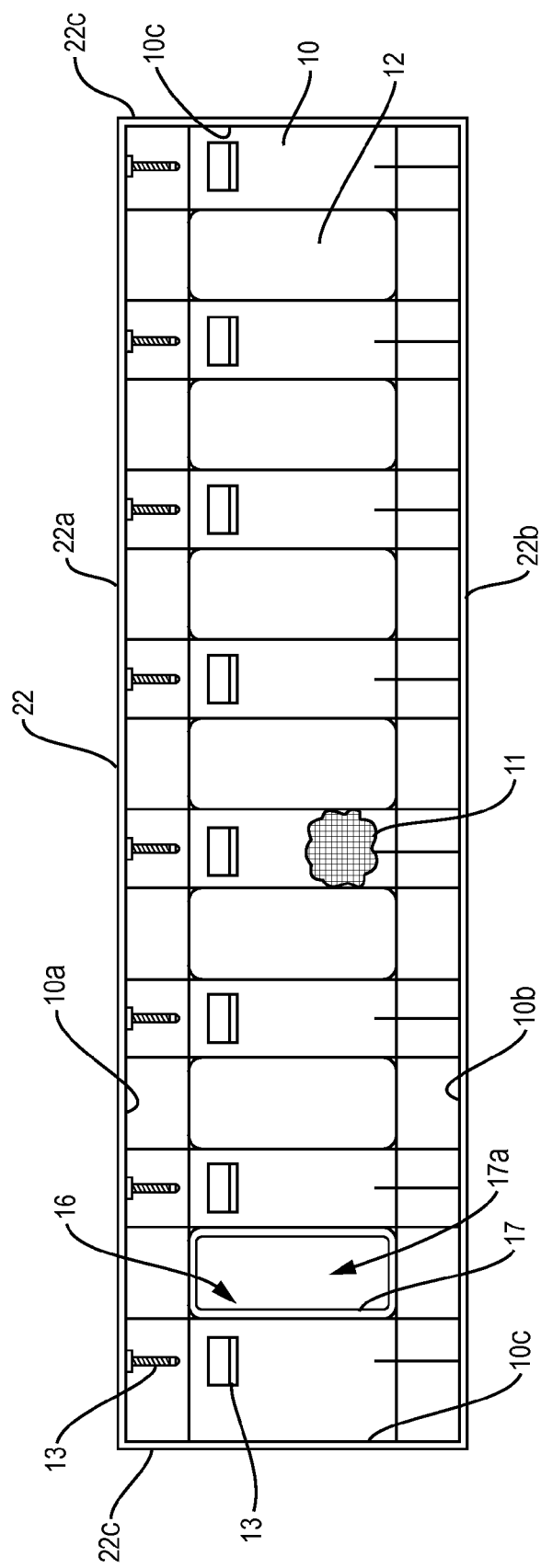

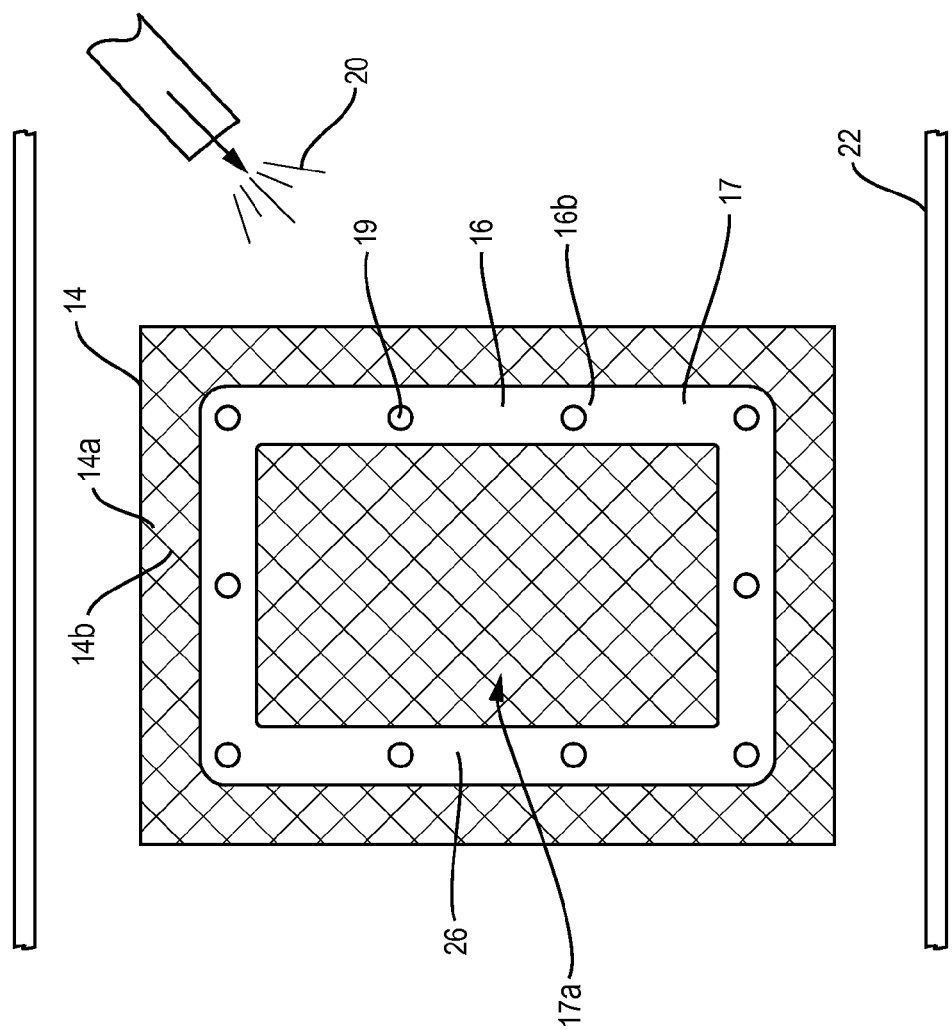

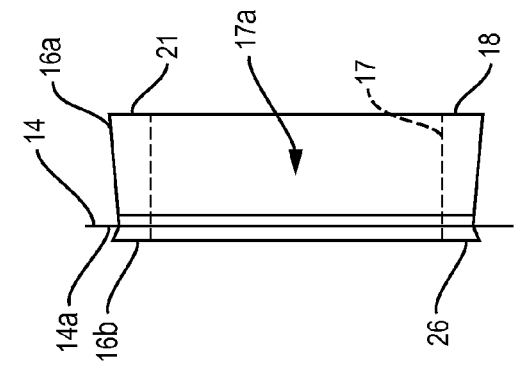
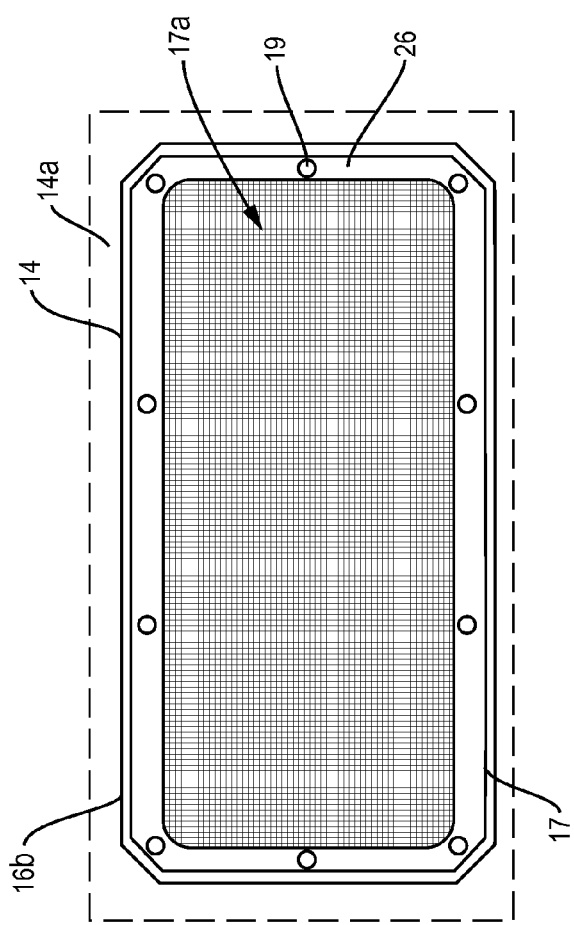
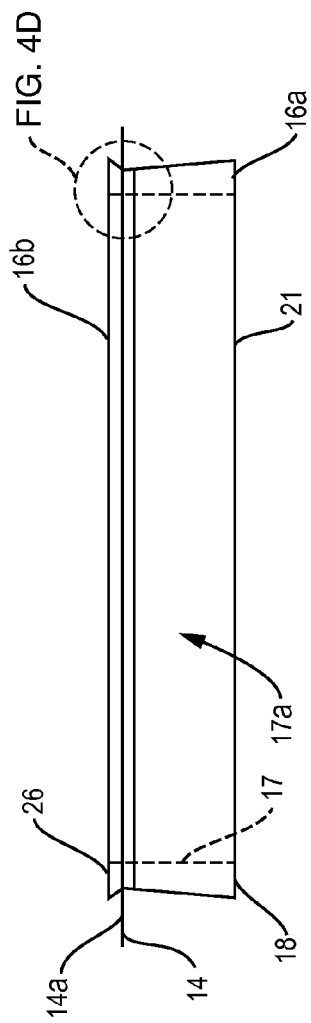

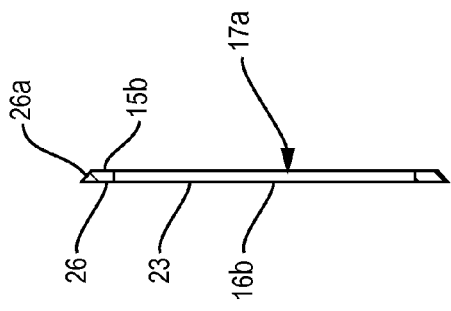
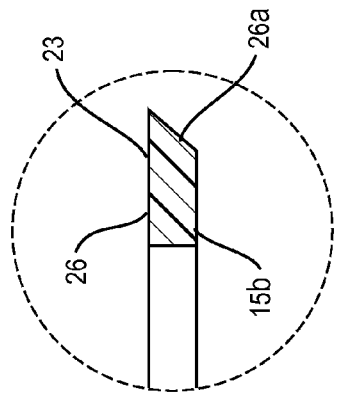
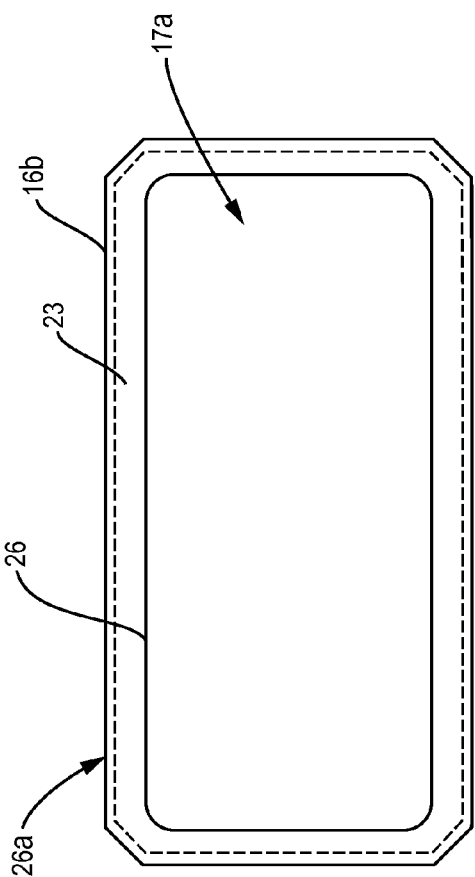
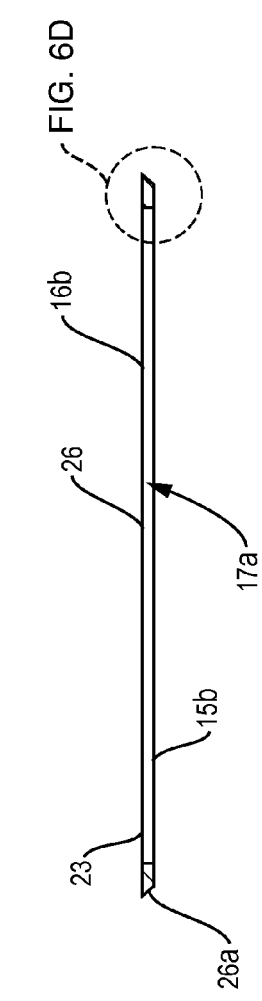

EMBEDDED MESH IN PRECAST WALLS

RELATED APPLICATION

This application claims the benefit of U.S. Provisional Application No. 61/292,654, filed on Jan. 6, 2010. The entire teachings of the above application(s) are incorporated herein by reference.

BACKGROUND OF THE INVENTION

Window openings or litewall openings can be included in pre-stressed or precast concrete wall panels. These openings typically are enclosed or screened-in after pouring or production of the concrete component. The openings, for example, may be enclosed or screened-in by anchoring a steel frame with chain link fence to the interior surface of the opening using concrete nails that are fastened through a strap that holds the chain link fence frame and into the concrete surface. In another approach, the chain link fence can be attached through a strap using bolts that are threaded into concrete shields or anchors. Such approaches tend to be expensive and time consuming.

SUMMARY OF THE INVENTION

The present invention generally relates to systems and methods for securely attaching a screen to a pre-stressed or precast concrete wall panel. A screen or mesh is embedded in a concrete form when the concrete form is poured. A window opening form is created in a portion of the concrete form. The window form may include a base which can be fixed, and a removable cap.

A mesh can be placed at the base of the window form. The outer edges of the mesh extend beyond the base of the window form. The removable cap is secured to the base of the window form. A seal can be created between the base of the window form and the removable cap using gaskets on opposed mating surfaces of the base of the window form and the removable cap. The gaskets of this seal assembly between the base of the window form and the removable cap can create a tight fitting seal which can prevent entry of concrete into the window opening of the window form when the concrete is poured. Portions of the concrete form can be stripped away and removed without removing the portion of the form that creates the window opening. In this way, the portions of the concrete form can be removed easily without binding on the form itself and requiring removal of the form that creates the window opening.

In another embodiment, the seal (or seal assembly) can be created between the base of the window form and the removable cap, where the base of the window form and the removable cap have opposing slots that creates a seal against the mesh.

The removable cap can be secured to the base of the window by threading the mesh to the window form. The removable cap can be secured to the base of the window form by clamping down the mesh to the window form. The mesh can be a screen and the window form can create a litewall opening.

The embedded mesh can be more securely attached to the concrete wall as compared with the prior approaches because it is embedded with the concrete when it is poured. The embedded mesh in the concrete form can be securely affixed to a wall panel portion of the concrete form. Embedding the screen or mesh into the concrete when it is poured eliminates an after pour installation procedure, which is typically used with prior approaches. By eliminating the after pour procedure, the embedded screen can allow the concrete to be poured without entering into the window opening. The base can include a taper or camber that allows for smooth separation and removal once concrete in the concrete wall panel hardens. The removable cap can further include a tapered perimeter that allows for smooth separation and removal once concrete in the concrete wall panel hardens. Unlike most prior approaches, with the present invention, window openings or litewall openings can be cast into the walls at the manufacturing plant as part of the fabrication process. Thus, embedding the screen in the concrete can save time, money, and eliminate after pour installation, while the screen is more securely affixed to the wall panel.

The present invention also provides a method of creating a screened opening in a concrete form. Mesh can be embedded in the concrete from when the concrete form is poured. A window form can be created in a portion of the concrete form. The window form can include a base which can be fixed, and a removable cap. Mesh can be placed at or on the base of the window form, where outer edges of the mesh extend beyond the base of the window form. The removable cap can be secured to the base of the window form. A seal can be created between the base of the window form and the removable cap, where the base of the window form and the removable cap have opposing slots that can create a seal against the mesh.

The present invention also provides a system for creating a screened opening in a concrete form when the concrete is poured, that can include a window form having a base which can be fixed, and a removable cap. A mesh can be at or on the base of the window form, where outer edges of the mesh extend beyond the base of the window form. The removable cap can be secured to the base of the window form. A sealing assembly can create a seal between the base of the window form and the removable cap.

The present invention also provides a form for a concrete wall panel including a series of form boundary walls for accepting concrete and forming the outer boundaries of the wall panel. At least one window form can be included for forming at least one window opening in the wall panel. The at least one window form can include a base which can be fixed, and a removable cap. Mesh can be on the base of the window form with outer edges of the mesh extending beyond the base of the window form for coverage by and being imbedded in the concrete. The removable cap can be secured to the base of the window form. A sealing assembly can create a seal between the base of the window form and the removable cap for preventing entry of the concrete therethrough.

The present invention further provides a concrete wall panel having a length, height and thickness. The wall panel can have at least one window opening including mesh material having outer edges cast into the wall panel. In particular embodiments, the at least one window opening can be formed with at least one window form. The at least one window form can include a base which can be fixed, and a removable cap. The mesh can be on the base of the window form with outer edges of the mesh extending beyond the base of the window form for coverage by and being imbedded in concrete. The removable cap can be secured to the base of the window form. A sealing assembly can create a seal between the base of the window form and the removable cap for preventing entry of the concrete therethrough.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2a-2b are plan views of a wall panel and formwork according to embodiments of the present invention.

FIG. 3 is a plan view of a window opening form or formwork according to an embodiment of the present invention.

FIGS. 4a-4c are top, side and end views of a window opening form according to embodiments of the present invention.

FIGS. 6a-6d are top, side and end and enlarged detail views of a top cap of the top of a window opening form according to an embodiment of the present invention.

DETAILED DESCRIPTION OF THE INVENTION

Figure 1:
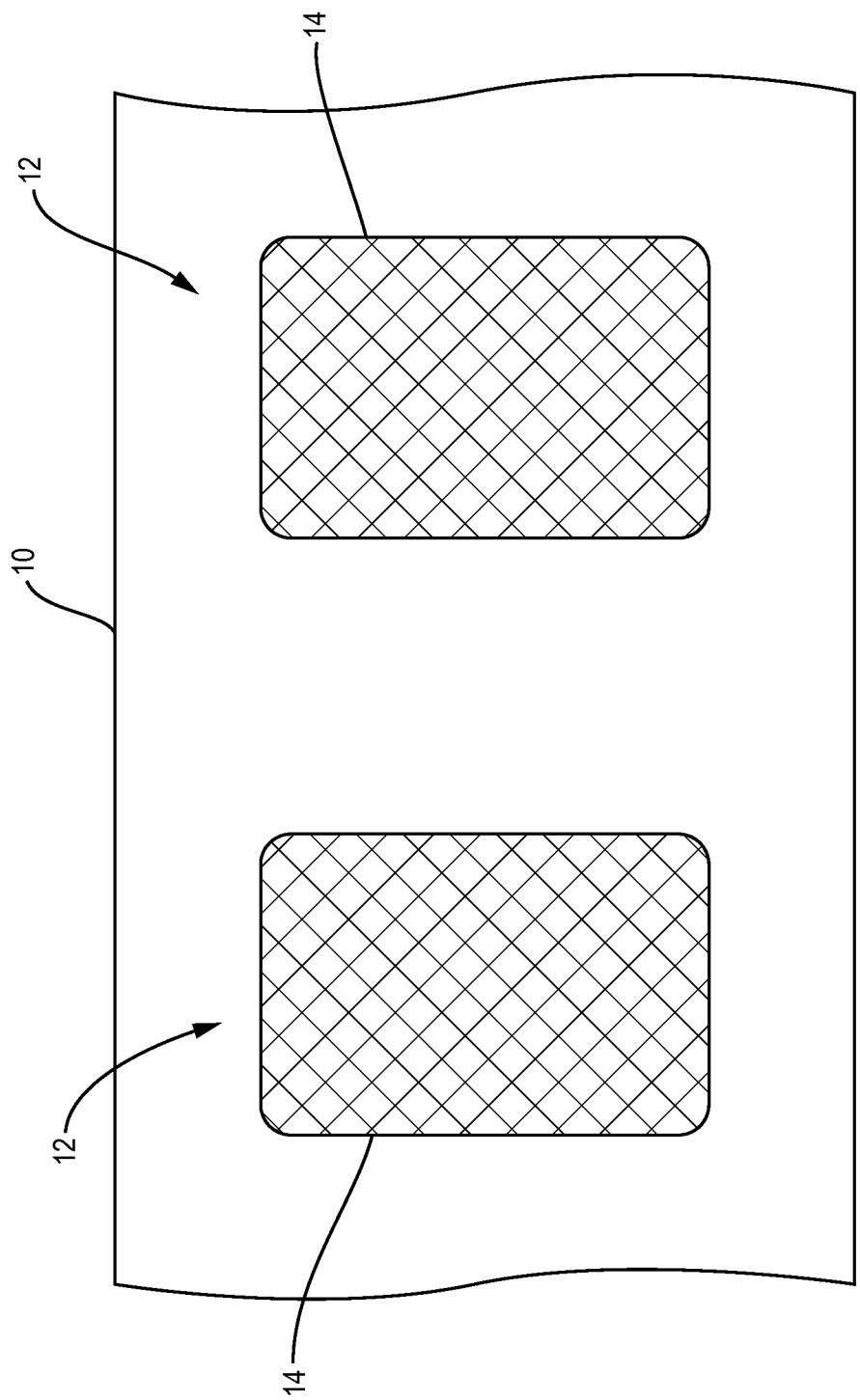
FIG. 1 is a plan view of a portion of a concrete wall panel having screened window openings according to an embodiment of the present invention.
Figure 2B:
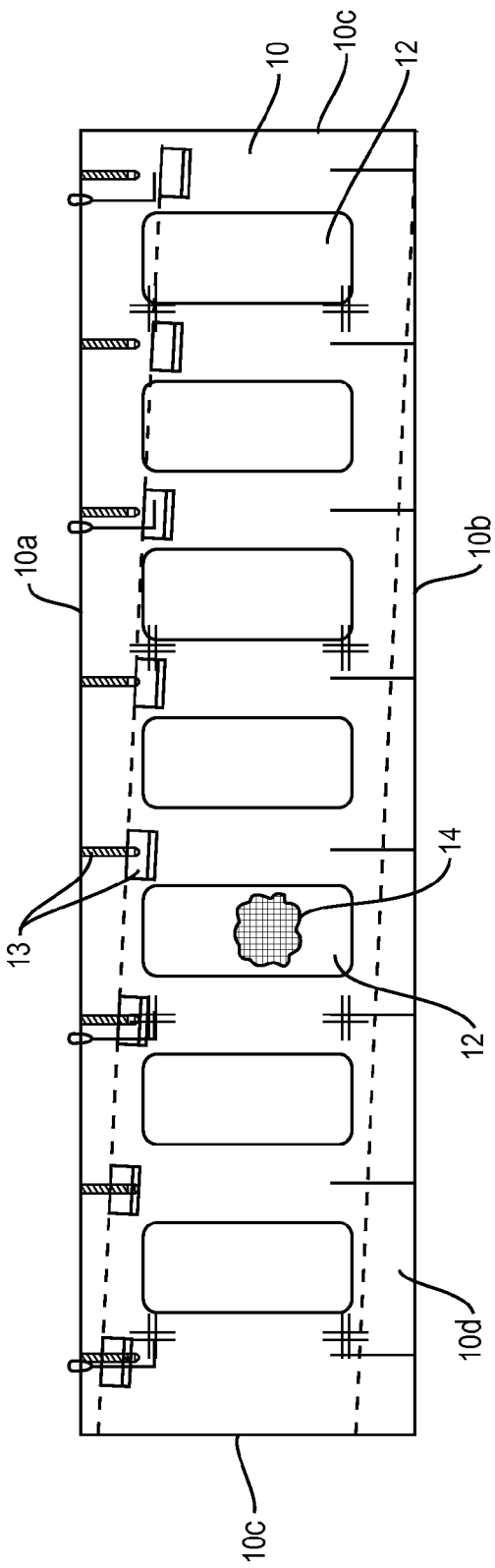
Figure 4D:
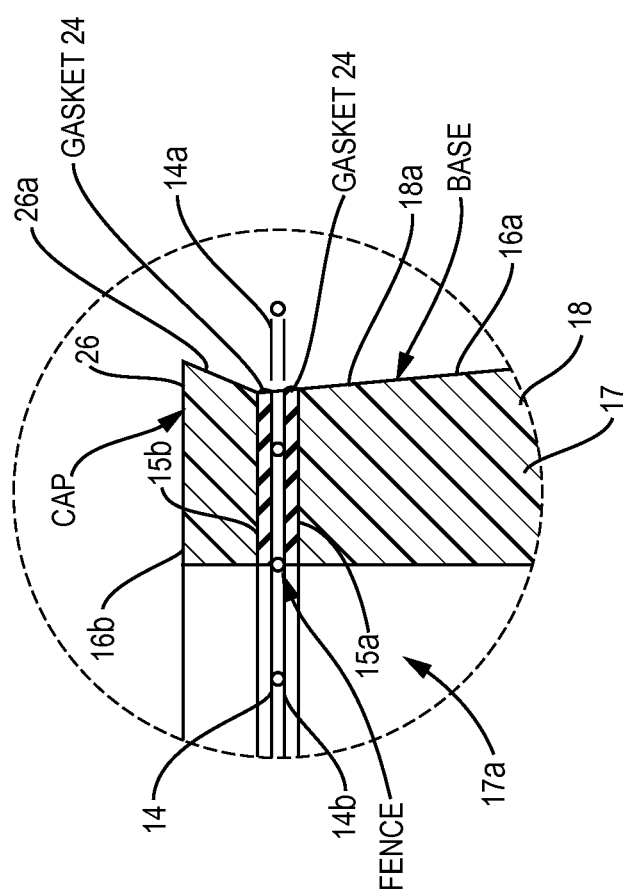
FIG. 4d is an enlarged sectional view of the seal assembly or arrangement of the cap and base, in one embodiment.
Figure 5C:
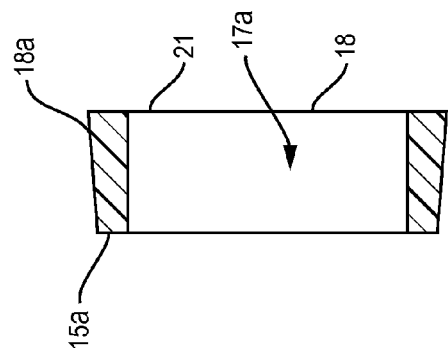
FIGS. 5a-5c are top, side and end views of a base of the window opening form according to an embodiment of the present invention.
Figure 5A:
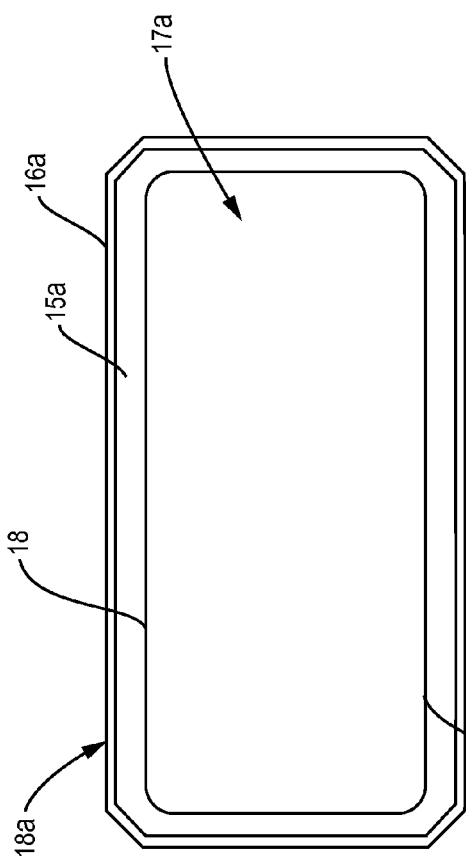
Figure 5B:
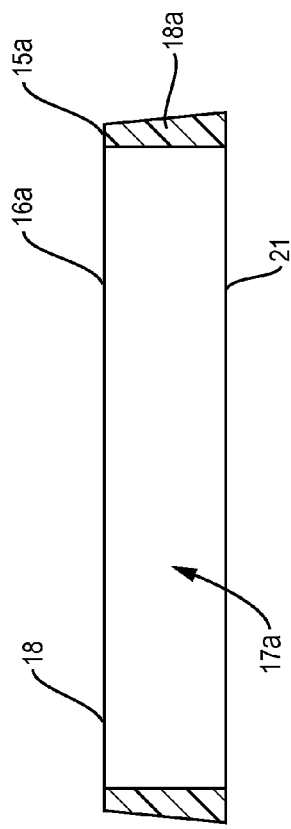

A description of example embodiments of the invention follows.

Referring to FIGS. 1, 2a, 2b, and 3, a screened or fenced 14 window aperture hole or opening 12 is created in a precast or pre-stressed concrete wall panel 10. The wall panel 10 can be reinforced concrete having reinforcement components 11 such as rebar and/or mesh, and has a length, height and thickness. One or more litewall openings or window openings 12 can be formed that can include screen, fencing or mesh material 14, including chain link fencing, expanded or apertured metal, or coated welded wire mesh, cast or embedded into the wall panel 10 to be securely affixed to the wall panel 10. The wall panel 10 can include various components or structures 13, such as for structural assembly or transportation purposes, which can be in various locations. The wall panel 10 can include a top 10a, a bottom 10b, ends 10c and faces 10d.

In some embodiments, the wall panel 10 can be in one example, about 47 feet long, about 12 feet high and about 1 foot thick. The window openings 12 can be generally rectangular in shape and in one example, can be about 3 feet wide and about 7 feet high. The corners of the window openings 12 can be chamfered, curved or radiused. Seven such window openings 12 can be formed in a wall panel 10 of this size, and evenly spaced apart from each other, centrally positioned along wall panel 10, in one example, about 6 feet apart, center to center. It is understood that depending upon the situation at hand, the dimensions, shape and configuration of the wall panel 10 and the window openings 12 can vary, as well as the number and positioning of the window openings 12.

The wall panel 10 can be cast in a wall panel form 22 having a series of boundary walls such as a top 22a, bottom 22b, sides 22c, and one or more window opening forms 16 which form the outer boundaries of the wall panel 10 and the boundaries of the window openings 12. The window opening form 16 can be generally rectangular in shape and fixed to form a generally rectangular perimeter ring shaped dam or wall 17 so that when concrete 20 is poured into the wall panel form 22, concrete 20 is prevented from entering the interior area or opening 17a surrounded by the wall 17 of the window opening form 16. The wall 17 of the window opening form 16 can have top and bottom surface which can be generally planer and parallel to each other to form a wall of constant height. The fencing 14 can be cast and embedded in the concrete 20 from the same concrete pour as when pouring the wall panel 10, thereby eliminating an after pour installation of the fencing 14.

As shown in FIGS. 4a-4d, 5a-5c and 6a-6d, the window opening form 16 can have a lower base, wall, dam, ring or first perimeter member 16a which can be fixed, and a top or upper cap, wall, dam, ring or second perimeter member 16b which can be removable. The fencing 14 can be placed on or over the base 16a. The outer edges 14a of the fencing 14 can extend outwardly horizontally beyond the outer perimeter of the base 16a. The cap 16b can be secured or clamped to the base 16a over and sandwiching the fencing 14 by one or more securing members 19, or threaded or clamp down connections, for example, by bolts or clamps, or other suitable fasteners. A tight fitting seal between the base 16a, the cap 16b and the fencing 14 can be achieved through the use of a sealing assembly or arrangement, which can include seals or gaskets 24 on the opposed mating surfaces 15a and 15b of the base 16a and cap 16b, with the fencing 14 sandwiched between the gaskets 24 to prevent the entry of concrete 20. The gaskets 24 can be generally planar, and formed of deflectable or compressible material which can include rubber, polymeric materials, natural fibers, etc. The wires or members 14b of the fencing 14 can press and seal against or become embedded into the gaskets 24 under compression between the base 16a and the cap 16b, so that the gaskets 24 can seal around the fencing 14 and between the base 16a and the cap 16b. The gaskets 24 can be generally rectangular ring shaped, and sized to mate with and match the shape of surfaces 15a and 15b which can be generally rectangular ring shaped planar surfaces. In some embodiments, the gaskets 24 can be about ¼ inch thick, and the fencing 24 can be formed of wire about ¼ inches in diameter, such that the space between the base 16a and the cap 16b can be about inches, occupied by two gaskets 24 and fencing 14. The base 16a, gaskets 24 and cap 16b can create a tight fitting seal, which does not allow the poured concrete 20 to enter into the opening 17a. When the concrete is stripped from this portion of the form 16, it can leave a clean finish between the fencing 14 and the concrete surface.

The base 16a can have an outer perimeter ring or wall 18 that can be generally rectangular in shape and can form the lower portion of the wall 17 of window opening form 16. Wall 18 can have a constant height, and the inner and outer corners of the wall 18 can be chamfered, curved or radiused. The wall 18 has an outer wall surface 18a on the outer perimeter which can be tapered outwardly, moving from the top, at or near surface 15a, to the bottom 21. In an example in one embodiment, the base 16a can be about 6 feet long, about 3 feet wide and about 10 inches high surrounding an interior area 17a about 5 feet 4 inches long and about 2 feet 4 inches wide. The wall 18 can be about 4 inches thick at the bottom 21 and about 3 inches thick at the top of surface 15a, and can form about a 1 inch camber or taper difference over the 10 inch height, which can be about a 6° taper. This taper toward the bottom 21 allows the base 16a to be easily or smoothly removed, separated or pulled away downwardly relative to the wall panel 10 after the concrete 20 hardens and cap 16b is removed. The taper can also result in the surface 15a at the top being about 5 feet 10 inches long and about 2 feet 10 inches wide. Surface 15a and bottom 21 can be generally parallel to each other.

The base 16a that creates the lower portion of the window opening form 16 can eliminate the prior practice, which typically provided that a window form be made of multiple pieces that collapse inward during the stripping of the piece. In addition, the prior practice typically provided that that those pieces be re-set for each pour, which is no longer required.

The cap 16b can have an outer perimeter ring or wall 26 that can be generally rectangular in shape, and can form the upper portion of wall 17 of window opening form 16. Wall 26 can have a constant height, and the inner and outer corners of wall 26 can be chamfered, curved or radiused. The wall 26 has an outer wall surface 26a on the outer perimeter which can be tapered outwardly moving from the bottom at surface 15b, to the top 23. In an example in one embodiment, the cap 16b can have a surface 15b that is about 5 feet 10 inches long and about 2 feet 10 inches wide, to match a mating surface 15a having the same dimensions. Surface 15b and top 23 can be generally parallel to each other. The cap 16b can have a shorter or smaller height than base 16a, for example a height of about 1¼ inches. For such a height, the wall 26a can have about a ½ inch camber or taper difference over the ¼ inch height, which can be about a 22° taper. With a height of 1¼ inches, the cap 16b can be about 5 feet 11 inches long and about 2 feet 11 inches wide. The taper toward the top 23 allows the cap 16b to be easily or smoothly removed, separated or pulled away upwardly relative to the wall panel 10 after the concrete 20 hardens and securing members 19 are removed or released. Consequently, the base 16a and the cap 16b can taper or angle in the direction of the concrete 20 from opposite sides of the fencing 14, downwardly and upwardly, forming opposed inward tapers on the outer surfaces of the outer perimeter of wall 17, moving away from fencing 14. It is understood that the size, shape and configuration of the window opening form 16, base 16a, cap 16b and gaskets 24 can vary depending upon the situation at hand. In some embodiments, the window opening form 16 can have round, curved, polygonal or complex shapes. In addition, in some embodiments, the base 16a can also be removable.

FIGS. 7a-7f depict another aspect of the window formwork according to an embodiment of the present invention. As shown in FIGS. 7a-7f, the base 16a and/or the cap 16b can be fabricated with a series or pattern of recesses, slots or grooves 16c which can engage the wires or members 14b of the fencing 14. The slots 16c can create a seal against the surface of the fencing 14 to prevent the passage of concrete 20, and in some embodiments, can be opposing slots 16c which can mate or match each other on opposite sides of the members 14b of the fencing 14.

Figure 7A:
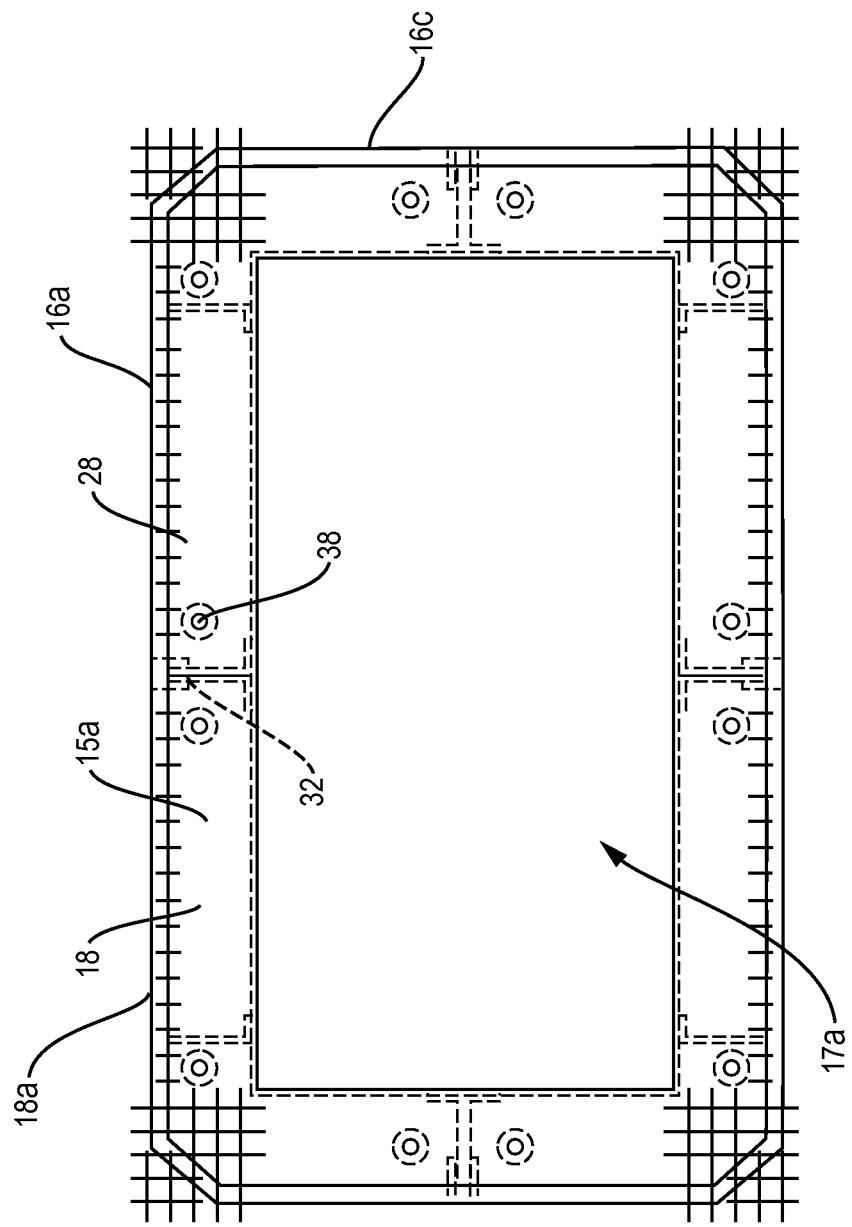
FIG. 7a is a plan view of the base or bottom section of a window formwork according to an embodiment of the present invention.
Figure 7B:
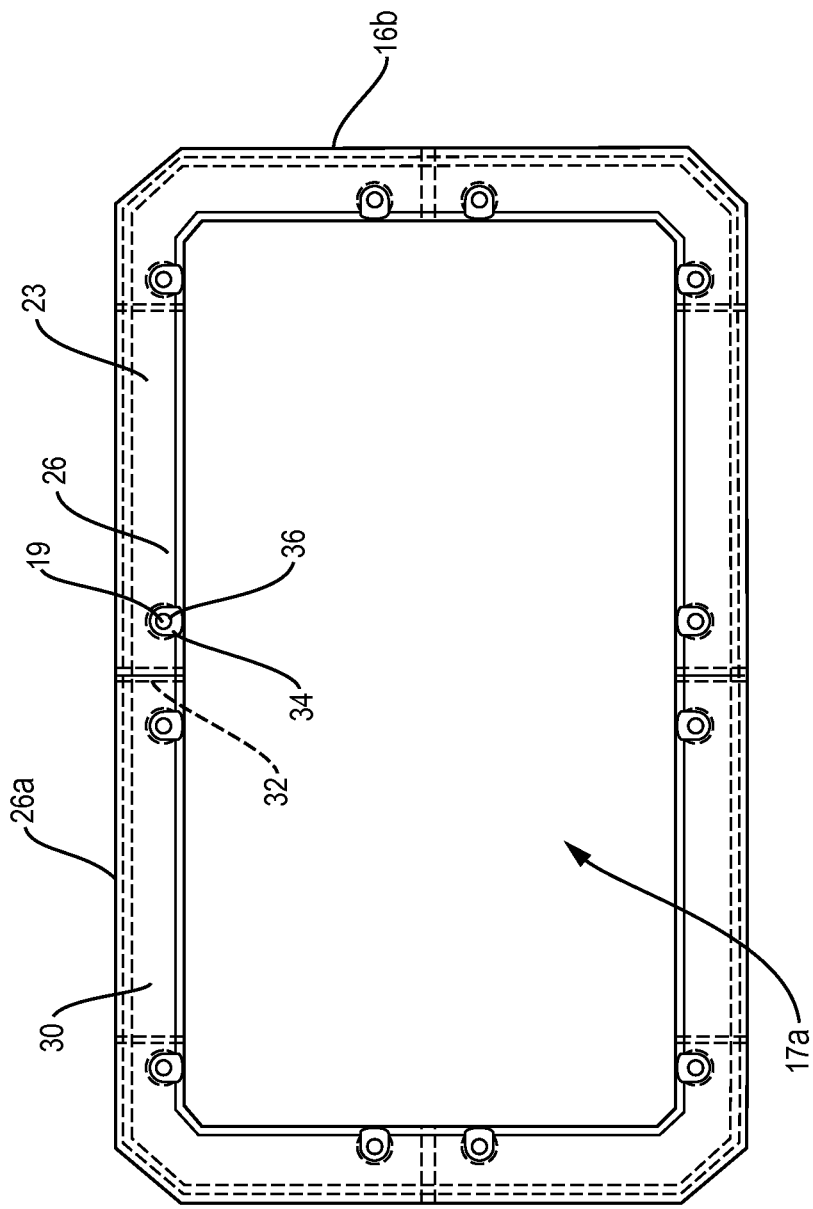
FIG. 7b is a plan view of the cap or top section of a window formwork according to an embodiment of the present invention.

In some embodiments, the slots 16c can be formed directly onto the base 16a and/or cap 16b of FIGS. 5a-5c and 6a-6d. In other embodiments, the base 16a and/or the cap 16b can include or be formed of filler sections 28 and 30 (FIGS. 7e and 7f), which can have a series or pattern of slots 16c formed in surfaces 15a and 15b. The filler sections 28 and 30 can be hollow, can be of various desired lengths and shapes, and can have ends bolted together with bolts 32. Also, filler sections 28 and 30 can be fitted over an existing base 16a and/or cap 16b. The slots 16c can be formed to match the particular size, configuration and pattern of the fencing 14 and wires or members 14b. FIGS. 1 and 3 show the fencing 14 in one embodiment having wires 14b on a diagonal orientation, and FIG. 4a shows the fencing 14 in another embodiment having wires 14b on horizontal and vertical orientations. FIGS. 7a and 7e show slots 16c orientated in a pattern for horizontal and vertical orientations. The slots 16c are shown to cover part of the surface 15a in FIGS. 7a and 7e, but in some embodiments, can cover the entire top surface 15a. The slots 16c can provide a recess for the wires 14b of the fencing 14 to engage and seal within. In some embodiments, the slots 16c can allow the surfaces 15a and 15b of base 16a and cap 16b to mate and seal together to prevent passage of concrete 20.

Figure 7C:
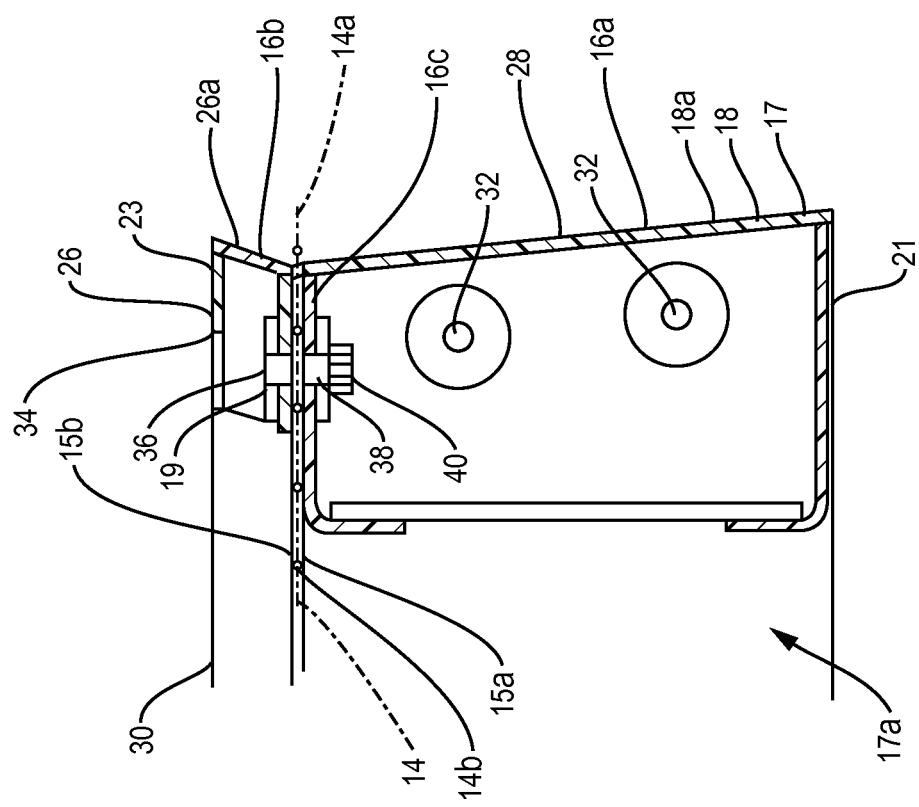
FIGS. 7c and 7d are section views of the top section of a window formwork showing the base and the cap implementation with opposing slots according to an embodiment of the present invention.
Figure 7D:
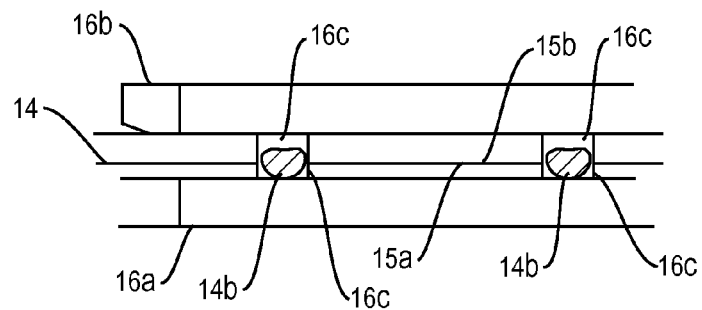
Figure 7E:
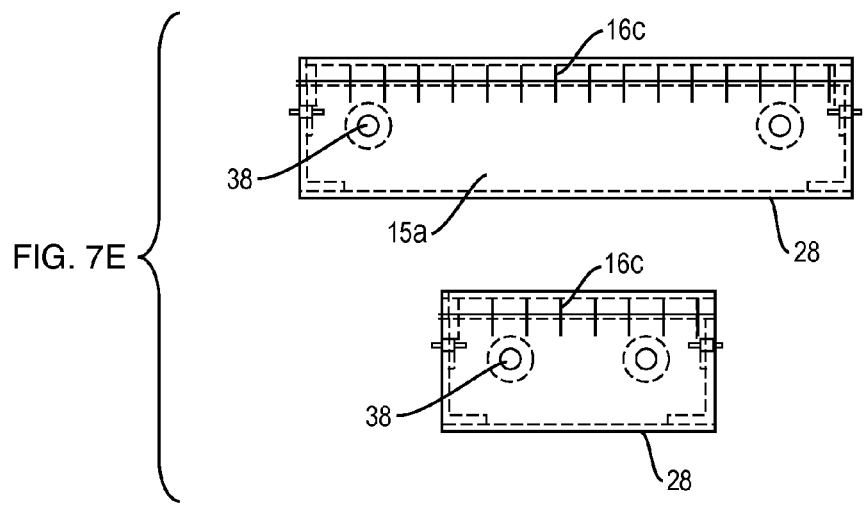
FIG. 7e is a plan view of examples of base or bottom filler sections according to an embodiment of the present invention.
Figure 7F:
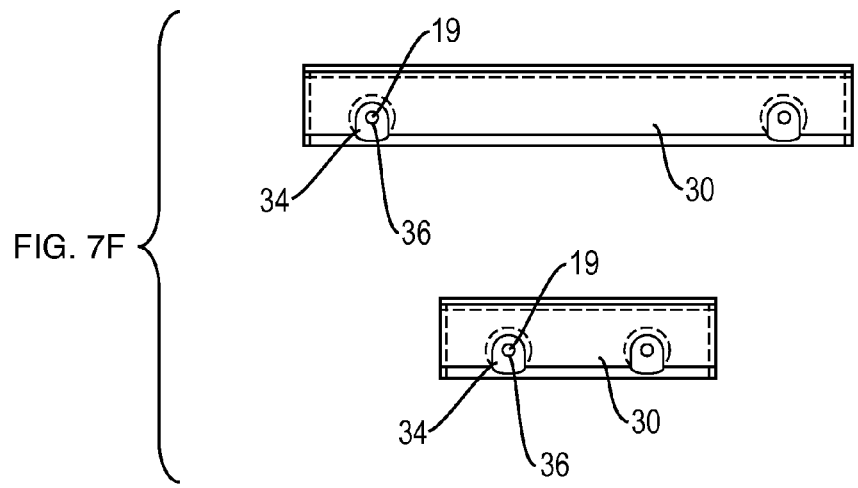
FIG. 7f is a plan view of examples of cap or top filler sections according to an embodiment of the present invention.

FIGS. 7c and 7d show the use of opposed slots 16c in the base 16a and cap 16b. However, in some embodiments, the slots 16c can be only in the base 16a, or only in the cap 16b. For some embodiments of fencing 14, the slots 16c can be about ¼ inch wide and spaced about 1½ inches. In some embodiments, the base 16a, cap 16b and filler sections 28 and 30, can be formed of metal, such as steel, and in other embodiments, can be formed of other suitable non-metal materials including wood, rubber, plastics, etc. FIG. 7c depicts a configuration in which the cap 16b can be clamped or secured to base 16a using bolts, washers and nuts for securing members 19, and can have an access opening, slot or hole 34 in the top 23 of cap 16b. A bolt can engage a hole 36 in the bottom of cap 16b, hole 38 in base 16a and nut 40. In some embodiments, the base 16a of FIG. 7a can be a variety of different desired sizes, for example, about 5 feet, 6 feet or 7 feet long, and can be about 3 feet wide. Using filler sections 28 and 30 which can be bolted together can allow different sized window opening forms 16 to be quickly assembled.

Using either method of sealing (FIGS. 4a-4d or FIGS. 7a-7f), the cap 16b can form the top of the window opening form 16 or dam of desired shape and of sufficient height. In this way, when concrete 20 is introduced, the concrete 20 covers the embedded perimeter 14a of the fencing or mesh 14 but does not enter the window opening 12, thereby casting the fencing 14 within the wall panel 10 with a clean separation between the concrete and the fencing 14.

The cap 16b can have a tapered perimeter 18 that allows for easy separation and removal once concrete comprising the wall panel hardens. Similarly, the fixed base 16a has a tapered perimeter allowing the wall panel 10 to be removed from the form after the cap 16b has been removed without the wall panel 10 binding on the form 10.

While this invention has been particularly shown and described with references to example embodiments thereof, it will be understood by those skilled in the art that various changes in form and details may be made therein without departing from the scope of the invention encompassed by the appended claims.

What is claimed is:

1. A method for creating a screened opening in a concrete form comprising:
   embedding a mesh in a concrete form when the concrete form is poured by:
      creating a window form in a portion of the concrete form, the window form including a base and a removable cap;
      placing a mesh at the base of the window form, where outer edges of the mesh extend beyond the base of the window form;
      securing the removable cap to the base of the window form; and creating a seal between the base of the window form and the removable cap using gaskets on opposed mating surfaces of the base of the window form and the removable cap.

2. A method as in claim 1 wherein the seal between the base of the window form and the removable cap prevents entry of concrete into the window form when the concrete is poured.

3. A method as in claim 1 wherein portions of the concrete form are removed without removing the portion that creates the window form.

4. A method as in claim 1 wherein securing the removable cap to the base of the window form further includes threading the mesh to the window form.

5. A method as in claim 1 wherein securing the removable cap to the base of the window form further includes clamping down the mesh to the window form.

6. A method as in claim 1 wherein the gaskets create a tight fitting seal which does not allow the poured concrete to enter into the window opening.

7. A method as in claim 1 wherein the mesh is a screen.

8. A method as in claim 1 wherein the window form creates a litewall opening.

9. A method as in claim 1 wherein the embedded mesh in the concrete form eliminates after pour installation of the mesh.

10. A method as in claim 1 wherein the embedded mesh in the concrete form is securely affixed to a wall panel portion of the concrete form.

11. A method as in claim 1 wherein the embedded mesh is implemented at a manufacturing plant as part of the fabrication process of the concrete form.

12. A method as in claim 1 wherein the base further includes a camber that allows for smooth separation and removal once concrete in the concrete wall panel hardens.

13. A method as in claim 1 wherein the removable cap further includes a tapered perimeter that allows for smooth separation and removal once concrete in the concrete wall panel hardens.

14. A system for creating a screened opening in a concrete form when the concrete form is poured comprising:
a window form in a portion of the concrete form having a base and a removable cap;
a mesh at the base of the window form, where outer edges of the mesh extend beyond the base of the window form;
the removable cap being secured to the base of the window form; and
a sealing assembly creating a seal between the base of the window form and the removable cap having gaskets on opposed mating surfaces of the base of the window form and the removable cap.

15. A system of claim 14 wherein the mesh is a screen.

16. A system of claim 14 wherein the base further includes a camber that allows for smooth separation and removal once concrete in the concrete form hardens.

17. A system of claim 14 wherein the removable cap further includes a tapered perimeter that allows for smooth separation and removal once concrete in the concrete form hardens.

18. A concrete wall panel having a length, height and thickness, the wall panel having at least one window opening comprising mesh material having outer edges embedded into the wall panel, and at least one removable window form, the at least one window form comprising a base and a removable cap, the mesh being on the base of said window form with outer edges of the mesh extending beyond the base of the window form covered by and being embedded in concrete, the removable cap being secured to the base of the window form, a sealing assembly creating a seal between the base of the window form and the removable cap having gaskets on opposed mating surfaces of the base of the window form and the removable cap.

19. A method for creating a screened opening in a concrete form comprising:
embedding a mesh in a concrete form when the concrete form is poured by:
creating a window form in a portion of the concrete form, the window form including a base and a removable cap;
placing a mesh at the base of the window form, where outer edges of the mesh extend beyond the base of the window form;
securing the removable cap to the base of the window form; and
creating a seal between the base of the window form and the removable cap using gaskets on opposed mating surfaces of the base of the window form and the removable cap, and clamping the mesh against the gaskets, and between the base and the removable cap.

20. A system for creating a screened opening in a concrete form when the concrete form is poured comprising:
a window form in a portion of the concrete form having a base and a removable cap;
a mesh at the base of the window form, where outer edges of the mesh extend beyond the base of the window form;
the removable cap being secured to the base of the window form;
a sealing assembly creating a seal between the base of the window form and the removable cap having gaskets on opposed mating surfaces of the base of the window form and the removable cap; and
a clamping arrangement for clamping the mesh against the gaskets, and between the base and the removable cap.

* * * * *

UNITED STATES PATENT AND TRADEMARK OFFICE
CERTIFICATE OF CORRECTION

PATENT NO.         : 8,418,428 B2
APPLICATION NO.    : 12/859047
DATED              : April 16, 2013
INVENTOR(S)        : Ronald W. DeAngelis, Ralph A. Schwarzer and Sandy S. Spring Page 1 of 1

It is certified that error appears in the above-identified patent and that said Letters Patent is hereby corrected as shown below:

Title Page, Item (73) Assignee:
    Delete "Unitrex Corporation, Pittsfield, MA"
    Insert --Unistress Corporation, Pittsfield, MA--

Signed and Sealed this
Twenty-first Day of May, 2013

Teresa Stanek Rea
*Acting Director of the United States Patent and Trademark Office*